J. W. RABB.
Frames for Cultivators, Scrapers, &c.
No. 149,154.  Patented March 31, 1874.
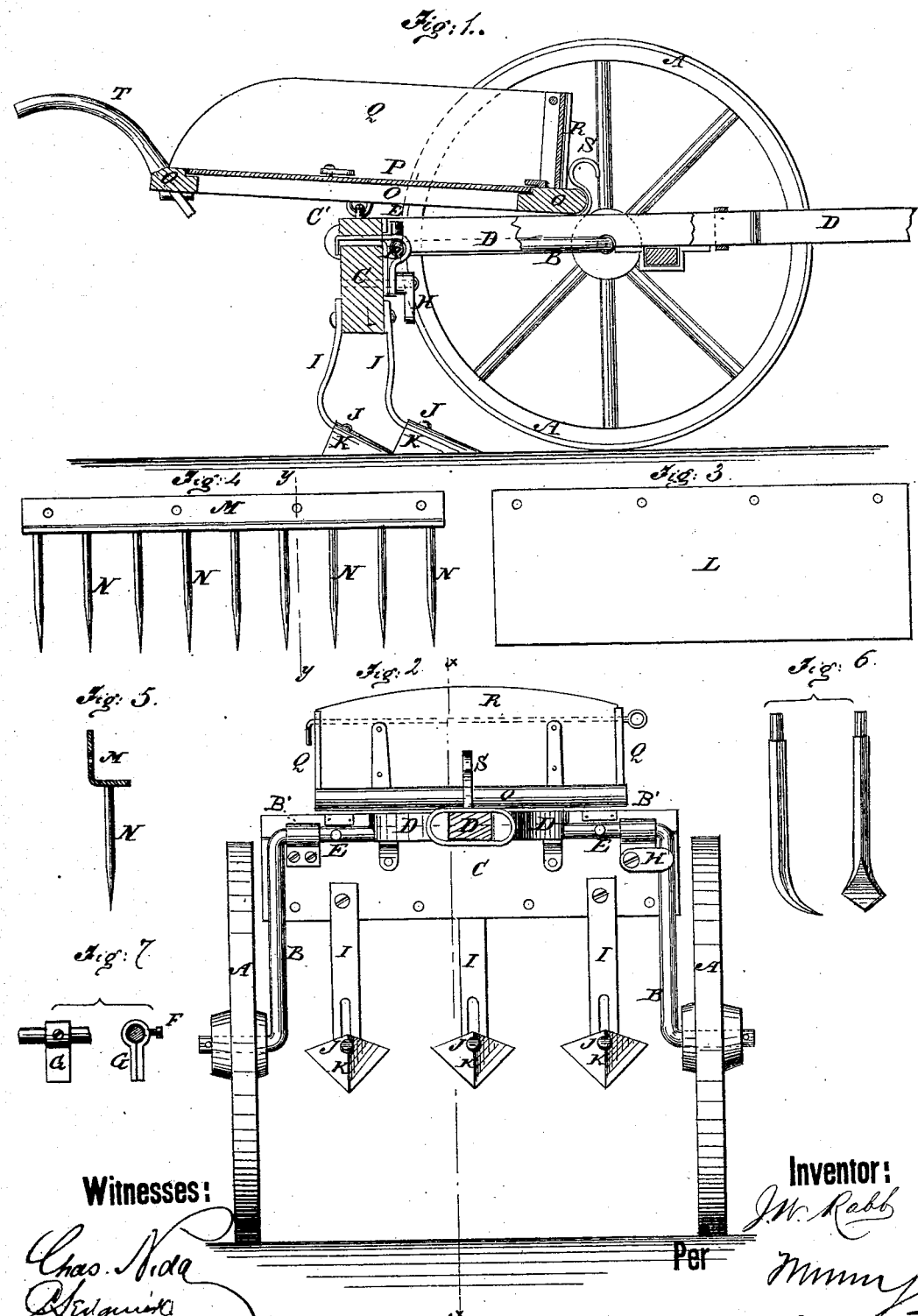
Witnesses:  
Inventor:  
Per  
Attorneys.

UNITED STATES PATENT OFFICE.

JOHN W. RABB, OF LA GRANGE, TEXAS.

IMPROVEMENT IN FRAMES FOR CULIVATORS, SCRAPERS, &c.

Specification forming part of Letters Patent No. 149,154, dated March 31, 1874; application filed June 21, 1873.

*To all whom it may concern:*

Be it known that I, JOHN WESLEY RABB, of La Grange, in the county of Fayette and State of Texas, have invented a new and useful Improvement in Combined Cultivator, Scraper, and Dumping-Cart, of which the following is a specification:

Figure 1 is a vertical longitudinal section of my improved machine taken through the line $x$ $x$, Fig. 2. Fig. 2 is a front view of the same. Fig. 3 is a detail view of the scraper. Fig. 4 is a detail view of the harrow. Fig. 5 is a cross-section of the harrow taken through the line $y$ $y$, Fig. 4. Fig. 6 is a side and front view of a cultivator-tooth. Fig. 7 is a front and side view of a device for securing the axle.

Similar letters of reference indicate corresponding parts.

The invention consists in so constructing the running-gear of a two-wheeled vehicle, that it may be conveniently applied to the several purposes hereinafter described.

A are the wheels, which revolve upon the journals of the axle B. The axle B is bent four times at right angles, giving it a crank form, as shown in Fig. 2. The middle part of the axle B works in bearings attached to the cross-beam C, to which the tongue D is rigidly attached, so that the axle B may be turned down to bring its side parts into a horizontal position, or turned up to bring its side part into a vertical position without changing the position of the cross-beam C. The downward movement of the axle B is limited by stop-pins E attached to said axle, and which strike against the upper part of the cross-beam C, or by set-screws F, which pass through bearings G attached to the said cross-beam C, and through which the said axle B passes, so that the said screws may operate upon the said axle. The axle B may be locked in place, when turned up, by a button, H, pivoted to the cross-beam C, and which may be turned over the side part of said axle, as shown in Fig. 2. I are the plow-standards, the upper ends of which are secured to the cross-beam C by one or more bolts. The lower ends of the standards I are slotted longitudinally to receive the bolts J, by which plows K are secured to said standards. The bolts J are made oblong in their cross-sections, so that they cannot turn in the slots of the standards I, are fitted into similarly-shaped holes in the plows K, and are secured in place by nuts screwed upon them. By this construction the plows K can be raised and lowered by simply loosening the nuts of the bolts J. The lower parts of the standards I are curved to give any desired pitch to the plows. The upper ends of the standards I may be all bolted to the forward side of the cross-beam C, or some may be bolted to the forward and some to the rear side of said beam, to prevent clogging, if the kind of plows to be used may require it. The clogging of the plows may be still further guarded against by bending the standards I. By attaching a marking-plow to each end of the cross-beam C, two rows, six feet apart, may be marked at a time. By attaching a third plow to the center of the cross-beam C, three rows, three feet apart, may be marked at a time. L is a scraper-plate, which is designed to be bolted to the forward side of the cross-beam C, and which is intended for use in covering cotton, corn, and other seeds, for filling up inequalities in the surface of the ground, to move the soil loosened by the plows in road-making, and for other similar uses. M is the harrow or rake head, to which the teeth N are secured by nuts, so that they can be removed and replaced with teeth of other form, as the work to be done may require. The head M is made with an upwardly-projecting flange upon its forward edge, which is designed to rest against the forward side of the cross-beam C, where it is secured by bolts passing through it and through the said cross-beam C. This brings the harrow-teeth directly below the cross-beam C. Different forms of teeth may be used, as, for instance, the form shown in Fig. 6. With this construction, should an obstruction be encountered, a very slight rise of the rear end of the machine will change the line of draft so that the draft upon the machine will raise the axle B into a vertical position, raising the plows, harrow, scraper, or whatever may be attached to the cross-beam C, and enabling them to pass over the obstruction. O is a frame consisting of two longitudinal bars connected at their front and rear ends by two cross-bars. The middle parts of the side bars of the frame O are hinged to the upper side of the cross-beam C. The inner edges of the side and end bars of the frame O are rabbeted to receive the bottom P, which is secured in place detachably by buttons or other convenient fastenings, so that the said bottom can be conveniently detached. Q are the side boards, and R is the front board, which are secured to the frame O by stakes attached to them, and which enter keepers attached to the said frame O.

When the machine is to be used for plowing, cultivating, harrowing, scraping, &c., the bottom P, side boards Q, and front board R are detached, so that the operating parts of the machine can be conveniently seen. S is a spring-catch attached to the tongue D, in such a position as to take hold of the front cross-bar of the frame O, and thus hold the cart-body securely in place. To the rear cross-bar of the frame O are attached two handles, T, for convenience in manipulating the machine. With this construction the machine can be used as a cart without detaching the plows, scraper, or harrow that may be attached to it, by simply raising the axle B into a vertical position.

Having thus described my invention, I claim as new and desire to secure by Letters Patent—

The beam C having button H, bearings B′, and staples C′, the hound-frame D having spring S, and the crank-axle B having stop-pins, E, all combined as described, and adapted to be used in connection with various farm implements, substantially as specified.

JOHN WESLEY RABB.

Witnesses:
W. W. LITTLE,
A. T. BRADSHAW.